(12) United States Patent
Toeniskoetter

(10) Patent No.: US 8,210,327 B2
(45) Date of Patent: Jul. 3, 2012

(54) COMBINED MOTION CONTROL AND BRAKE RELEASE APPARATUS

(75) Inventor: James B. Toeniskoetter, Rochester Hills, MI (US)

(73) Assignee: Hirotec America, Inc., Auburn Hills, MI (US)

( * ) Notice: Subject to any disclaimer, the term of this patent is extended or adjusted under 35 U.S.C. 154(b) by 970 days.

(21) Appl. No.: 12/220,120

(22) Filed: Jul. 22, 2008

(65) Prior Publication Data

US 2009/0028473 A1    Jan. 29, 2009

Related U.S. Application Data

(60) Provisional application No. 60/961,729, filed on Jul. 24, 2007.

(51) Int. Cl.
*F16D 65/24* (2006.01)
*F16F 9/00* (2006.01)

(52) U.S. Cl. ............ 188/170; 188/73.1; 72/214; 901/14

(58) Field of Classification Search ................. 188/72.1, 188/72.9, 73.1, 265, 382, 170; 74/89.32; 384/7; 72/214, 220, 453.01; 901/14, 30
See application file for complete search history.

(56) References Cited

U.S. PATENT DOCUMENTS

| 2,121,366 | A | * | 6/1938 | Robinson ..................... 303/89 |
| 2,349,911 | A | * | 5/1944 | Neighbour et al. ............ 414/582 |
| 3,485,537 | A | * | 12/1969 | Korner et al. .................... 303/9 |
| 4,841,869 | A | * | 6/1989 | Takeuchi et al. .............. 104/292 |
| 5,340,247 | A | * | 8/1994 | Cuneo et al. .................. 409/202 |
| 2008/0302159 | A1 | * | 12/2008 | Toeniskoetter et al. ......... 72/214 |

* cited by examiner

*Primary Examiner* — Melody Burch
(74) *Attorney, Agent, or Firm* — Fildes & Outland, P.C.

(57) ABSTRACT

A combined motion control and brake apparatus and method includes a linear longitudinal rail, a bearing block supported on the linear longitudinal rail, a linear rail brake fixed to the linear longitudinal rail, a carrier connected to the rail brake and supported by the bearing block, a pair of linear cross slide rails fixed on the carrier, the cross slide rails disposed generally at right angles to the longitudinal rail, a cross slide bearing block mounted on each cross slide rail, a cross slide supported on the cross slide bearing block moveable in both longitudinal and lateral directions, relative to the longitudinal rails, the cross slide including an engagement feature, and an engager operable to engage the engagement feature to release the rail brake and to move the cross slide rail.

7 Claims, 3 Drawing Sheets

COMBINED MOTION CONTROL AND BRAKE RELEASE APPARATUS

CROSS REFERENCE TO RELATED APPLICATION

This application claims the priority of U.S. Provisional Application No. 60/961,729 filed Jul. 24, 2007.

TECHNICAL FIELD

This invention relates to a combined motion control and brake release apparatus for movable mounts, such as for carrying tooling, or work to be modified by tooling, particularly including pneumatically released linear rail brakes.

BACKGROUND OF THE INVENTION

A traditional method of releasing a linear rail brake requires the use of a pneumatic valve, control logic, pneumatic logic or other means of initiating the flow of pressurized air to the linear rail brake. Linear rail motion is normally provided by pneumatic, electric, hydraulic or similar types of drive mechanisms.

SUMMARY OF THE INVENTION

The present invention provides a combined motion control and brake release apparatus for operating a slidable mount mechanism for support and control of mounts, such as for carrying tooling or work to be modified by tooling. The slidable mount mechanism particularly includes pneumatically released linear rail brakes. The invention allows a robot actuated engagement pin to both release the brakes and reposition the mechanism in a single operation. The invention also provides a method of operating such a slidable mount mechanism.

More specifically, a combined motion control and brake release apparatus in accordance with the present invention includes at least one linear longitudinal rail and a bearing block supported on the linear longitudinal rail. A linear rail brake is fixed to the linear longitudinal rail. A carrier connected to the rail brake is supported by the bearing block. A pair of linear cross slide rails is fixed on the carrier. The cross slide rails are disposed generally at right angles to the longitudinal rail.

A cross slide bearing block is mounted on each cross slide rail, and a cross slide is supported on the cross slide bearing block and is able to move in both longitudinal and lateral directions, relative to the longitudinal rails. The cross slide includes an engagement feature and an engager, which engages the engagement feature to release the rail brake and to move the cross slide rail.

In an embodiment, the rail brake may include a locking spring mechanism and the brake is released by applying fluid pressure against the spring mechanism. The engagement feature may be a housing that includes a recess. The engagement feature may include a fluid passage extending from the recess to the linear brake. Optionally, there may be a pin engageable in the recess, which would be operatively connected to an air supply and mounted on a robot arm.

Additionally, the combined motion control and brake release apparatus may include a linear rail brake fixed to the linear cross slide rails and connected with the cross slide for controlling lateral motion of the cross slide. The rail brake may include a locking spring mechanism and the brake may be released by applying fluid pressure against the spring mechanism. The engager may be operable to release all of the rail brakes and move the cross slide rail.

A combined motion control and brake method includes providing the combined motion control and brake release apparatus, inserting the engager into the engagement feature, and supplying fluid pressure to the rail brake to release said brake. The method also includes moving the engager to move the cross slide and mechanism to a desired position and disengaging the engager from the engagement feature to fix the slide in the desired position.

These and other features and advantages of the invention will be more fully understood from the following detailed description of the invention taken together with the accompanying drawings.

DETAILED DESCRIPTION OF THE INVENTION

Figure 1:
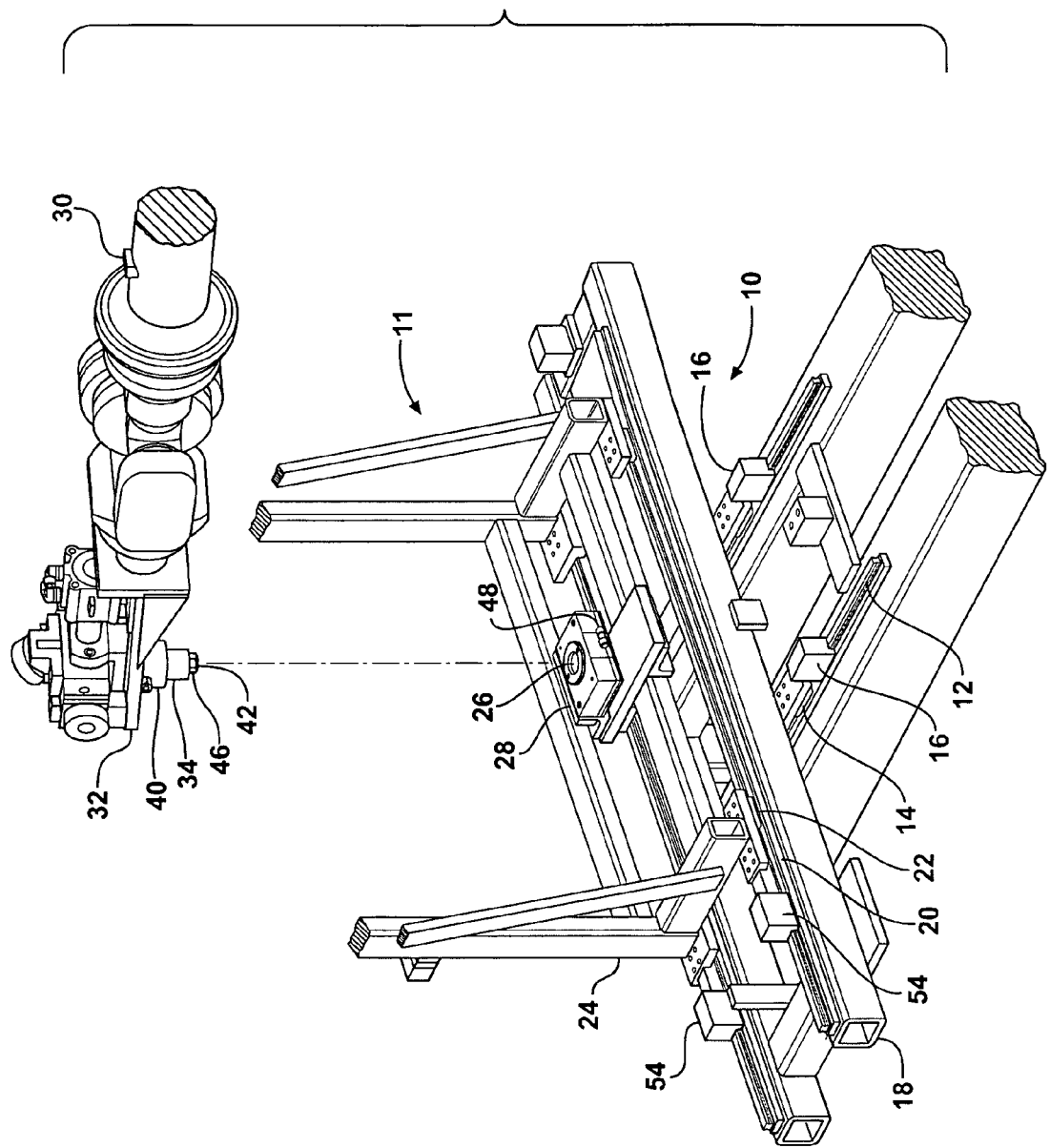
FIG. 1 is an isometric view of a combined motion control and brake release apparatus in accordance with the present invention.
Figure 2:
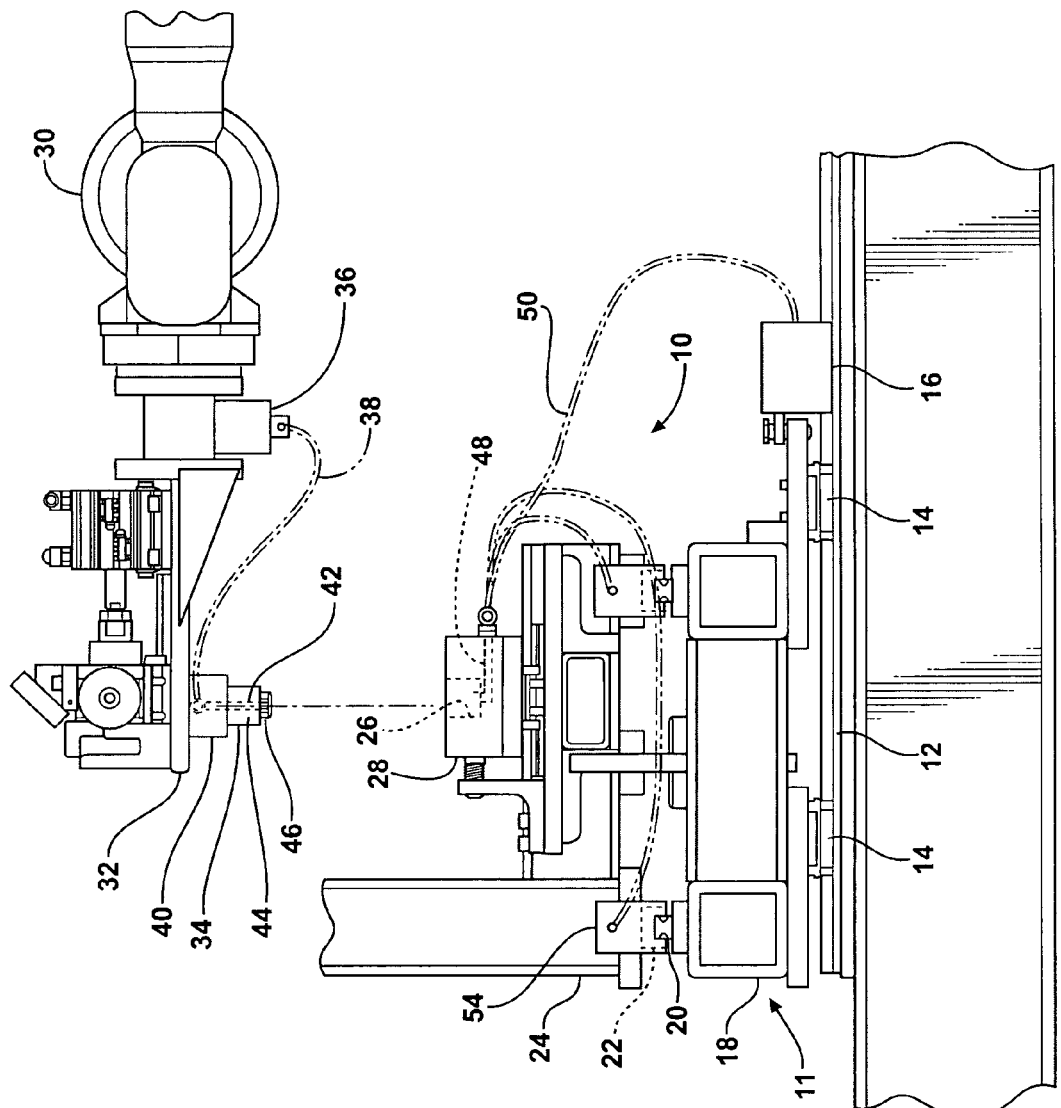
FIG. 2 is an elevational view showing the combined motion control and brake release apparatus in a disengaged disposition.
Figure 3:
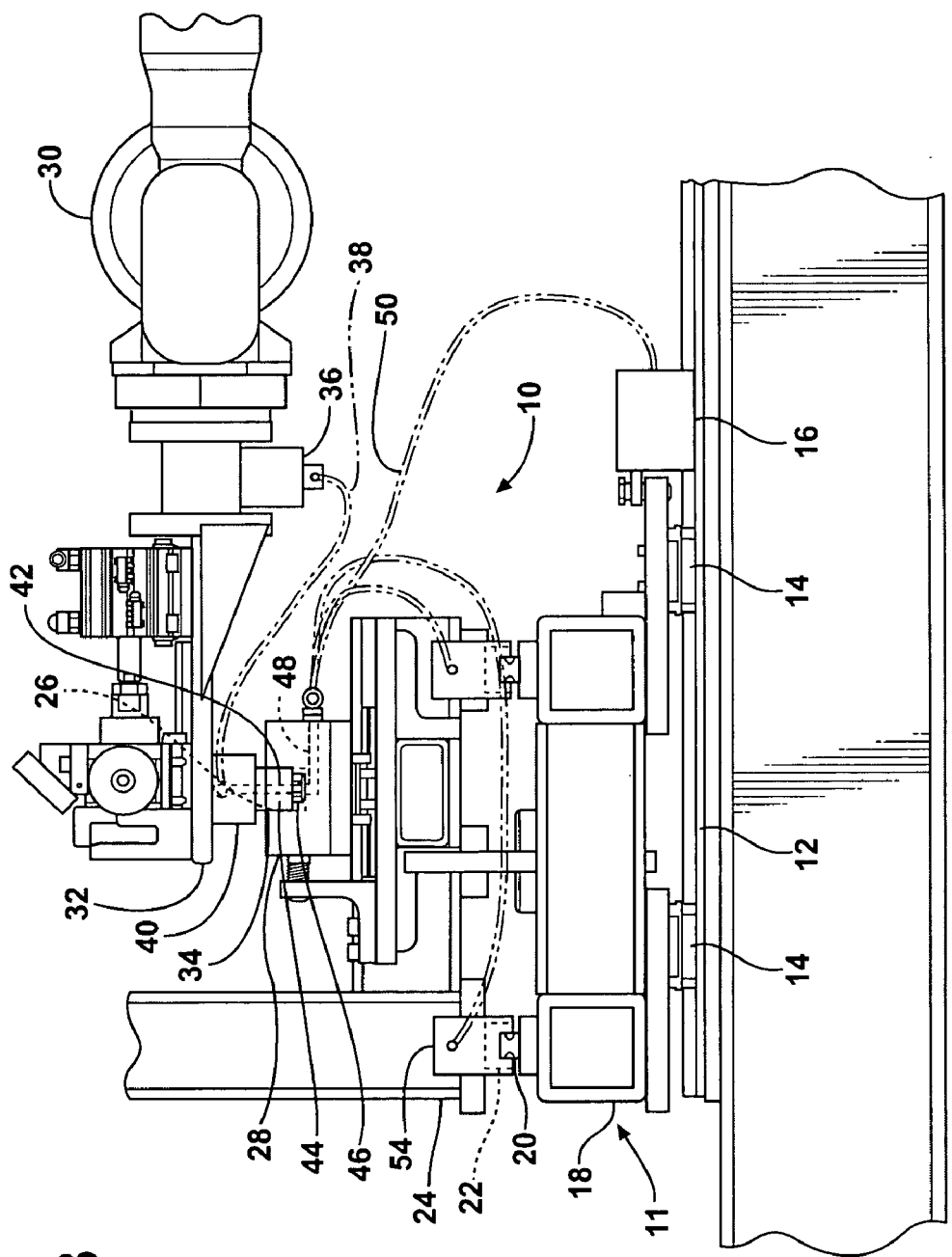
FIG. 3 is an elevational view showing the combined motion control and brake release apparatus in an engaged disposition.

In an exemplary embodiment illustrated in the accompanying drawing, numeral 10 generally indicates the combined motion control and brake release apparatus 10, which includes a slidable mount mechanism 11. The mount mechanism 11 includes one or more linear longitudinal rails 12 that support bearing block(s) 14 slidable on the rails 12. A linear rail brake 16 is fixed to at least one of the rails 12. The bearing blocks 14 support a plate or carrier 18 that is connected to the rail brake 16 to maintain the carrier in desired longitudinal positions along the rails 12. On the carrier 18 are fixed a pair of linear cross slide rails 20 extending generally at right angles to the longitudinal rails 12.

Each cross slide rail 20 slidably carries a cross slide bearing block 22. The cross slide bearing blocks 22 support a cross slide 24 that is movable in a plane in both longitudinal and lateral directions, relative to the longitudinal rails 12. A linear rail brake 54 is fixed to at least one of the cross rails 20. The bearing blocks 22 support a cross slide that is connected to the rail brake(s) 54 to maintain the cross slide in desired lateral positions along the rails 20. The cross slide 24 may be connected with and/or support a tool or workpiece, not shown, for use in manufacturing or for other purposes. The cross slide includes a recess 26 that may be disposed in a housing 28 fixed to the cross slide 24.

To engage the recess, the apparatus includes a robot arm 30 having a mount 32 that is adapted to receive an engagement pin 34. The mount is connected with a source of pneumatic pressure that may include a flow control or pressure regulator 36 connected with the mount 32 by a pneumatic hose assembly 38.

The engagement pin 34 may be threadably attached to an adapter plate 40 fixed to the robot mount 32. An air passage 42 through the pin connects with the pneumatic pressure source through the mount 32. The pin 34 may also include a cylindrical guide portion 44 receivable in the recess 26 of the cross slide 24. An air pressure fitting 46 including a ball check valve, not shown, extends from the guide portion 44 and sealingly engages the cross slide 24 when the engagement pin 34 is seated.

The air passage 42 connects through air passage 48 in the cross slide 24 with a second pneumatic hose assembly 50 that supplies pressurized air to the linear rail brake 16. Alternatively, a second rail brake 54 can be carried on one of the cross slide rails 20 and be connected with the cross slide 24 for controlling lateral motion of the cross slide.

The rail brakes 16 are of a type in which the locking action of the brakes is applied by a spring-loaded mechanism and the brakes are released by applying pneumatic pressure against the spring mechanism to release the brakes. The ball check valve in the air pressure fitting 46 is arranged to cut off air flow through the pin when it is not inserted in the cross slide recess 26.

In operation, the mount mechanism 11 may be stored in a home or rest position when not in use. A method of using the mechanism may include the following steps:

The robot arm 30 inserts the engagement pin 34 into the recess 26 of the mechanism cross slide 24. Seating of the pin 34 in the recess engages the pressure fitting 46 with the cross slide 24, thereby sealing the air passages 42 and 48 against air leakage from the connection and opening the check valve in the pressure fitting 46. This opens the air passages 42 and 48 to air flow from the pressure regulator to the rail brake(s) 16 and releases the brakes.

The robot arm 30 then uses the pin 34 to move the mechanism 11 from the rest position to a work position by sliding the cross slide 24 along the longitudinal and cross slide rails as needed.

The arm 30 then removes the pin 34 from the recess 26, cutting off air pressure from the pressure regulator 36 and releasing the brake pressure, thereby allowing self re-application of the rail brake(s) by their internal spring(s), thus retaining the cross slide 24 in the work position.

After completion of work in the work position, the robot arm 30 reinserts the pin 34 in the recess 26, releasing the brakes, and moves the mechanism 11 back to its rest position, removing the pin and re-applying the brakes to hold the mechanism at rest.

The invention thus enables a single robot with an air pressurized engagement pin to both release the mechanism rail brakes and reposition the mechanism by inserting the engagement pin in the recess and then lock the mechanism in a new position by removing the pin from the recess.

While the invention has been described by reference to an exemplary embodiment it should be understood that the concepts involved could be applied to numerous other applications without departing from the spirit and scope of the invention as described.

What is claimed is:

1. A combined motion control and brake release apparatus comprising:
   at least one linear longitudinal rail;
   a bearing block supported on said at least one linear longitudinal rail;
   a first linear rail brake fixed to at least one of said at least one linear longitudinal rail;
   a carrier connected to said first linear rail brake, said carrier being supported by said bearing block;
   a pair of linear cross slide rails fixed on said carrier, said linear cross slide rails disposed generally at right angles to said at least one longitudinal rail;
   a cross slide bearing block mounted on each linear cross slide rail;
   a cross slide supported on said cross slide bearing block mounted on each linear cross slide rail being moveable in both longitudinal and lateral directions, relative to said at least one linear longitudinal rail;
   said cross slide including an engagement feature having a housing that includes a recess and a fluid passage extending from said recess to said first linear rail brake; and
   an engager operable to engage said engagement feature to release said first linear rail brake and to move said linear cross slide rails.

2. The apparatus of claim 1 wherein said first linear rail brake is released by supplying fluid pressure to said first linear rail brake.

3. The apparatus of claim 1 including a pin engageable in said recess, said pin being operatively connected to an air supply and mounted on a robot arm.

4. The apparatus of claim 1 including a second linear rail brake fixed to at least one of said linear cross slide rails and connected with said cross slide for controlling lateral motion of the cross slide.

5. The apparatus of claim 4 wherein said second linear rail brake is released by supplying fluid pressure to said second linear rail brake.

6. The apparatus of claim 5 wherein said engager is operable to release all said first and second linear rail brakes and move said linear cross slide rails.

7. A combined motion control and brake method comprising the steps of:
   providing at least one linear longitudinal rail;
   a bearing block supported on said at least one linear longitudinal rail;
   a linear rail brake fixed to at least one of said at least one linear longitudinal rail;
   a carrier connected to said linear rail brake, said carrier being supported by said bearing block;
   a pair of linear cross slide rails fixed on said carrier, said linear cross slide rails disposed generally at right angles to said at least one linear longitudinal rail;
   a cross slide bearing block mounted on each linear cross slide rail;
   a cross slide supported on said cross slide bearing block mounted on each linear cross slide rail being moveable in both longitudinal and lateral directions, relative to said at least one linear longitudinal rail;
   said cross slide including an engagement feature having a housing that includes a recess and a fluid passage extending from said recess to said first linear rail brake; and
   an engager operable to engage said engagement feature to release said linear rail brake and to move said linear cross slide rails;
   inserting said engager into said engagement feature;
   supplying fluid pressure to said linear rail brake to release said linear rail brake;
   moving said engager to move said cross slide to a desired position; and
   disengaging said engager from said engagement feature to fix said cross slide in said desired position.

* * * * *